(12) United States Patent
Oktar et al.

(10) Patent No.: US 11,085,761 B2
(45) Date of Patent: Aug. 10, 2021

(54) DETERMINING SURFACE STRUCTURES OF OBJECTS

(71) Applicant: Hewlett-Packard Development Company, L.P., Spring, TX (US)

(72) Inventors: Alper Oktar, Bristol (GB); Stephen Pollard, Bristol (GB); Guy Adams, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/613,819

(22) PCT Filed: Oct. 30, 2017

(86) PCT No.: PCT/US2017/059114
§ 371 (c)(1),
(2) Date: Nov. 15, 2019

(87) PCT Pub. No.: WO2019/088982
PCT Pub. Date: May 9, 2019

(65) Prior Publication Data
US 2020/0263979 A1    Aug. 20, 2020

(51) Int. Cl.
*G01B 11/25*    (2006.01)

(52) U.S. Cl.
CPC ................. *G01B 11/2527* (2013.01)

(58) Field of Classification Search
CPC .... G01N 21/55; G01N 21/4738; G01N 21/57; G01N 21/9501; G01N 2021/4711; G01N 2021/556; G01N 21/8806; G01N 21/47; G01N 21/474; G01N 2201/061; G01N 2201/12; G01N 2021/4707; G01N 2021/4792; G01N 2021/8809; G01N 2021/8848; G01N 2021/8864; G01N 2021/8877; G01N 2021/8896; G01N 21/21; G01N 21/88; G01N 21/95; G01N 21/956; G01N 2201/0612; G01N 2201/105; G01N 21/25; G01N 21/31; G01N 33/18; G01N 2021/1736; G01N 2021/1748; G01N 2021/845; G01N 21/255; G01N 21/8422; G01N 2201/0635; G01N 2201/068; G01N 2021/1776; G01N 2021/3177; G01N 2021/4723; G01N 2021/4735; G01N 2021/4783; G01N 2021/555; G01N 2021/557; G01N 2021/575; G01N 2021/8427;
(Continued)

(56) References Cited

U.S. PATENT DOCUMENTS 6,040,910 A    3/2000  Wu et al.
6,696,679 B1   2/2004  Graef et al.
(Continued)

OTHER PUBLICATIONS

EpiToF: A Time-of-flight Depth Camera That Works Outdoors in Bright Sunlight; (2017); Available at: http://www.cs.cmu.edu/~ILIM/epitof/html/index.html.
(Continued)

*Primary Examiner* — Michael P Stafira
(74) *Attorney, Agent, or Firm* — Conley Rose PC

(57) ABSTRACT

A system for determining the surface structure of an object, the system comprising a first assembly including an illumination source, and a binary mask to generate a binary pattern, the binary mask disposed between the illumination source and a defocusing element to modify the binary pattern to provide a continuously modulated fringe pattern to illuminate the surface of the object.

14 Claims, 7 Drawing Sheets

(58) Field of Classification Search
CPC .......... G01N 2033/0095; G01N 21/01; G01N 21/251; G01N 21/3563; G01N 21/41; G01N 21/4785; G01N 21/552; G01N 21/59; G01N 21/8851; G01N 2201/02; G01N 2201/06113; G01N 2201/06146; G01N 2201/062; G01N 2201/0627; G01N 2201/0636; G01N 2201/0637; G01N 2201/08; G01N 33/00; G01B 11/24; G01B 11/303; G01B 2210/56; G01B 11/005; G01B 11/245; G01B 11/25; G01B 11/2504; G01B 11/2513; G01B 11/2518; G01B 11/306; G02B 5/3025; G02B 26/04; G02B 1/11; G02B 2207/109; G02B 26/101; G02B 30/25; G02B 5/0221; G02B 5/045; G02B 5/12; G02B 5/124; G02B 5/20; G02B 5/305; G01J 3/0208; G01J 3/0224; G01J 3/0289; G01J 3/04; G01J 3/42; G01J 1/0271; G01J 3/18; G01J 3/2823; G01J 2003/2826; G01J 2003/2866; G01J 3/0205; G01J 3/0232; G01J 3/0237; G01J 3/0256; G01J 3/0264; G01J 3/0278; G01J 3/06; G01J 3/10; G01J 3/14; G01J 3/28; G01J 3/2803; G01J 3/40; G01J 3/433; G01J 3/465; G01J 3/504; G01J 3/513

See application file for complete search history.

(56) References Cited

U.S. PATENT DOCUMENTS

| | | | | |
|---|---|---|---|---|
| 6,788,210 | B1* | 9/2004 | Huang | G06T 17/10 340/612 |
| 9,621,876 | B2 | 4/2017 | Federspiel | |
| 2003/0048458 | A1 | 3/2003 | Mieher et al. | |
| 2003/0234786 | A1* | 12/2003 | Cole | G06T 15/506 345/426 |
| 2007/0091302 | A1* | 4/2007 | Harding | G01B 11/2513 356/237.1 |
| 2007/0291993 | A1* | 12/2007 | Nisper | G01N 21/55 382/108 |
| 2011/0080471 | A1* | 4/2011 | Song | G01B 11/245 348/46 |
| 2011/0101570 | A1 | 5/2011 | John et al. | |
| 2013/0153651 | A1* | 6/2013 | Fedorovskaya | G06K 5/00 235/375 |
| 2013/0155417 | A1* | 6/2013 | Ohsawa | G06T 7/521 356/610 |
| 2013/0156330 | A1* | 6/2013 | Kane | G06K 9/00 382/218 |
| 2014/0064603 | A1* | 3/2014 | Zhang | G01B 11/2513 382/154 |
| 2014/0078264 | A1* | 3/2014 | Zhang | G01B 11/2513 348/47 |
| 2014/0111616 | A1 | 4/2014 | Blayvas | |
| 2014/0354681 | A1* | 12/2014 | Xiong | G06T 7/00 345/619 |
| 2015/0260509 | A1* | 9/2015 | Kofman | G01B 11/2504 356/601 |
| 2016/0261851 | A1* | 9/2016 | Tian | G06T 7/80 |

OTHER PUBLICATIONS

Ullah, Dr. Furqan "Real 3D: Think of Design with Dimensions," (2017) real3d.pk, Available at: http://real3d.pk/intraoralscanner.html.

* cited by examiner

DETERMINING SURFACE STRUCTURES OF OBJECTS

BACKGROUND

Three-dimensional (3D) capture systems can be used to capture the surface structure of a wide range of 3D objects. These can vary from the very small to the medium/large.

Traditional 3D capture systems may use a digital light processing (DLP) projector to project a sequence of phase shifted high spatial frequency sine waves which are captured by a single camera. Analysis of the intensities recovered at each point in the image sequence allows the overall phase to be recovered. In such projectors, large fans are used to decrease the temperature, along with control boards for managing the projection sequence and high-power illumination sources.

BRIEF DESCRIPTION OF THE DRAWINGS

Various features of certain examples will be apparent from the detailed description which follows, taken in conjunction with the accompanying drawings, which together illustrate, by way of example only, a number of features, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

According to an example, there is provided a low-cost method to capture 3D surface structure data based on phase shift structured light. Use of a DLP projector is replaced by a single low-cost binary mask, such as a square wave grating for example, and one or more illumination sources, such as LEDs for example and a defocusing element such as a defocused lens for example.

In an example, phase shifting can be achieved by either moving the grating or switching/moving the illumination source. This results in a significantly reduced cost system with potential to reduce the overall device size, weight and power consumption, which makes the 3D scanner more portable and more energy efficient. Temperature instability in a DLP projector changes the projection characteristics which increases the scanner errors. As the projector used in the present approach is much simpler and more efficient than a DLP, this effect is negligible.

Figure 1:
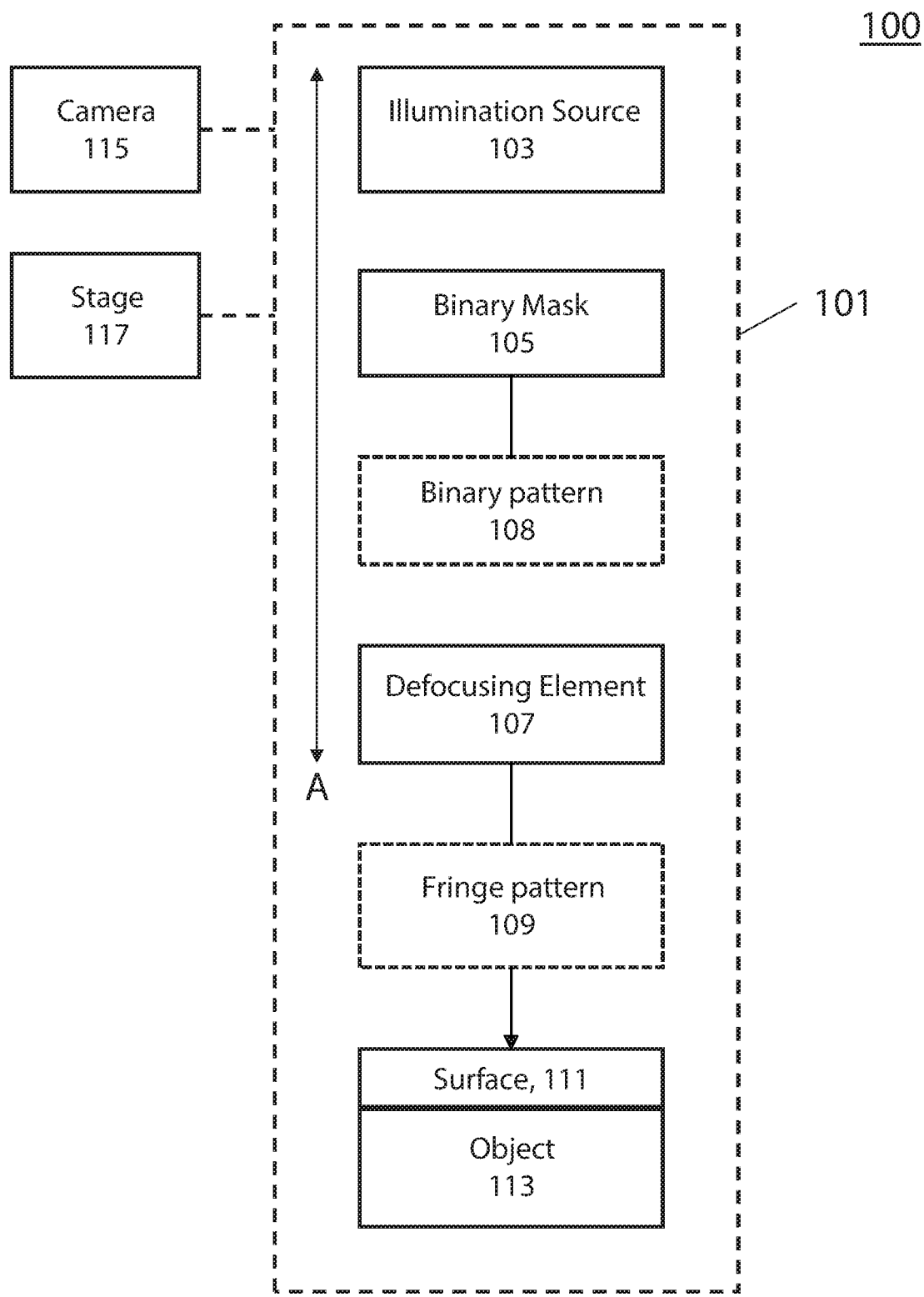
FIG. 1 is a schematic representation of a system for determining the surface structure of an object according to an example.

FIG. 1 is a schematic representation of a system for determining the surface structure of an object according to an example. The system 100 comprises a first assembly 101 including an illumination source 103. The illumination source can be a visible or non-visible source and can be broad- or narrow-band. In an example, one or more LED light sources can be used.

A binary mask 105 is used to generate a binary pattern. In the example of FIG. 1 the binary mask 105 is disposed between the illumination source 103 and a defocusing element 107. The defocusing element is used to modify the binary pattern 108 generated using the binary mask 105 to provide a continuously modulated fringe pattern 109 to illuminate the surface 111 of the object 113.

Multiple such assemblies can be provided according to an example in order to illuminate the surface 111 of an object 113 from different angles.

In the example of FIG. 1, the illumination source 103 is a 2 W white LED projected onto a binary mask 105 in the form of a low-cost binary pattern glass Ronchi ruling which has 100 lines per inch. The defocusing element 107 is a 12 mm f1.4 manual lens that defocuses the binary pattern 108 generated as a result of light passing through the mask 105 to generate the fringe 109.

In the example of FIG. 1, the defocusing element 107 suppresses higher order harmonics of a square wave to allow the first order harmonic (sine wave) to dominate. The defocusing of the lens is approximately that of a low-pass Gaussian blurring, which has the desired effect. In an example, the illumination source 103, the binary mask 105 and the defocusing element 107 can be disposed along an axis, A. That is, the illumination source 103, the binary mask 105 and the defocusing element 107 can be arranged in spaced relation to one another along the axis A such that light from source 103 travels substantially parallel to the axis A, passing through mask 105 and element 107.

As an example, a 16 mm radius fringe with 16 line pairs can be generated.

Figure 2:
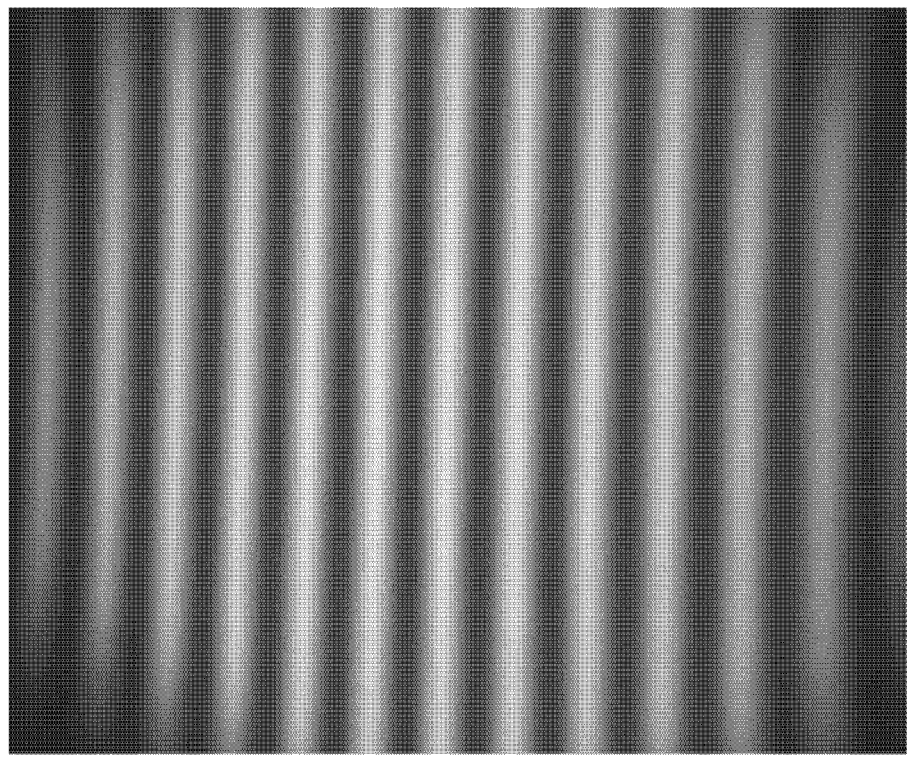
FIG. 2 is an image from a monochrome camera showing the 13 line pairs of a continuously modulated fringe pattern that can be used to illuminate the surface of an object according to an example.

FIG. 2 is an image from a monochrome camera showing the 13 line pairs of a continuously modulated fringe pattern (from 16 projected, 13 are captured by an imaging device) that can be used to illuminate the surface of an object according to an example. Of course, any number of line pairs can be projected, within reason, and the camera does not have to capture all of them if, as in the example of FIG. 2, the field of view of the camera does not match the projected area provided that both the projected pattern and camera fields to cover the area of interest.

According to an example, a series of fringe patterns can be projected on to an object and captured by a camera 115. The phase distribution that contains the object's height information can then be calculated by analysis of the images. Thus, according to an example, the generated fringe pattern is shifted in order to use a phase shifting method to determine a surface structure of an object.

In an example, a fringe pattern can be shifted by moving the binary mask 105 in order to generate shifted fringes. For example, a manual XYZ stage 117 can be used to generate the required fringe and move the mask 105.

As an illustrative example, the area of the generating fringe pattern can be 4 mm×4 mm and there are 16 line pairs in this area. After (or before) defocusing the element 107, one period of the fringe is calculated as 256 um (4 mm/16).

Four images, which are 90 degrees phase shifted from each other, can be generated. As one period of the fringe is 256 um, three 64 um movements of the mask 105 in the X direction using stage 117 provides four successive 90° phase shifted images, $I_1$ to $I_4$. Other phase increments can be used, e.g. 45, 22.5 deg. and so on.

According to an example, the intensity of a captured image at location c by camera n can be expressed as:

$$I_n^c = A^c + B^c \cos(\phi + \delta_n)$$

where $A^c$ is the background intensity, $B^c$ is the intensity modulation, $\phi$ is the unknown depth dependent phase value for each pixel and $\delta_n$ is one of the user imposed phase shift values.

In an example, the desired phase information can be calculated by a processor according to:

$$\phi = \arctan\frac{\sum_{n=0}^{N-1} I_n^c \sin(\delta_n)}{\sum_{n=0}^{N-1} I_n^c \cos(\delta_n)}$$

Referring to the above where four phase shifted fringe patterns are provided, this means that, in that example:

$$\phi = \arctan\frac{I_4^c - I_2^c}{I_1^c - I_3^c}$$

According to an example, a direct mapping between the recovered phase $\phi$ and the 3-D coordinates of the object can be derived through a calibration process using a planar calibration plate measured at a sequence of carefully controlled depths.

That is, in an example, a flat calibration surface (e.g. diffuse white) can be used and moved though small increments in the Z axis to capture the phase at incremental changes in height. An alternative is to use a stepped calibration surface that can be moved laterally to simulate effective changes in Z height.

In this way, a given measurement of the phase at a point on the surface of an object will correspond to a specific height of the object surface structure. Accordingly, by determining the phase as described above, it is possible to determine the surface structure of an object.

Figure 3A:
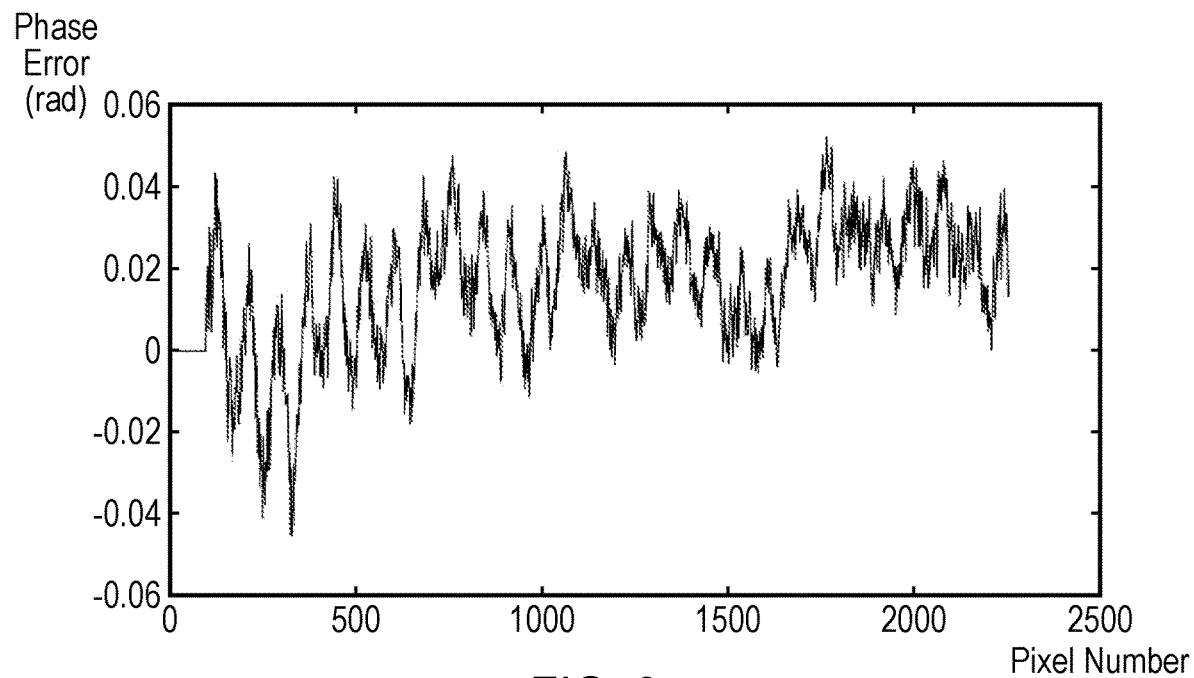
FIGS. 3a-3b show the comparison of the residual phase error using a grating (FIG. 3b) compared with that using a DLP projector (FIG. 3a), according to an example.
Figure 3B:
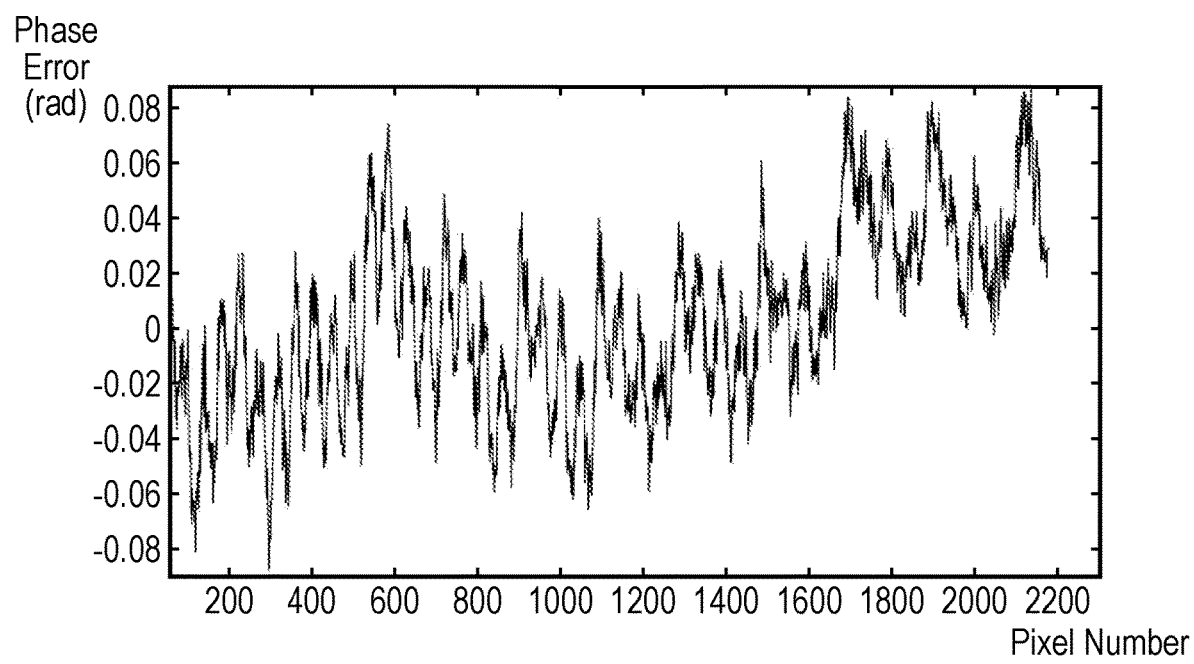

FIGS. 3a-3b show the comparison of the residual phase error using a grating (3b) compared with that using a DLP projector (3a), according to an example. In each case a linear model is fitted and subtracted from the phase measured along a single image row for a planar surface.

The results show that moving the fringes generated by mask 105 with an illumination source 103 and an element 107 can replace the DLP projector for 3D capture. The phase error is directly related to 3D capture resolution and accuracy.

After generating a fringe pattern 109, the shifted images can, in an example, be generated by moving the illumination source 103 instead of moving the mask 105. The illumination source 103 can be shifted using the stage 117. Moving the illumination source 103 by the appropriate amount will shift the images 90° in phase. The desired phase can be calculated using the same formulas as given above.

Figure 4A:
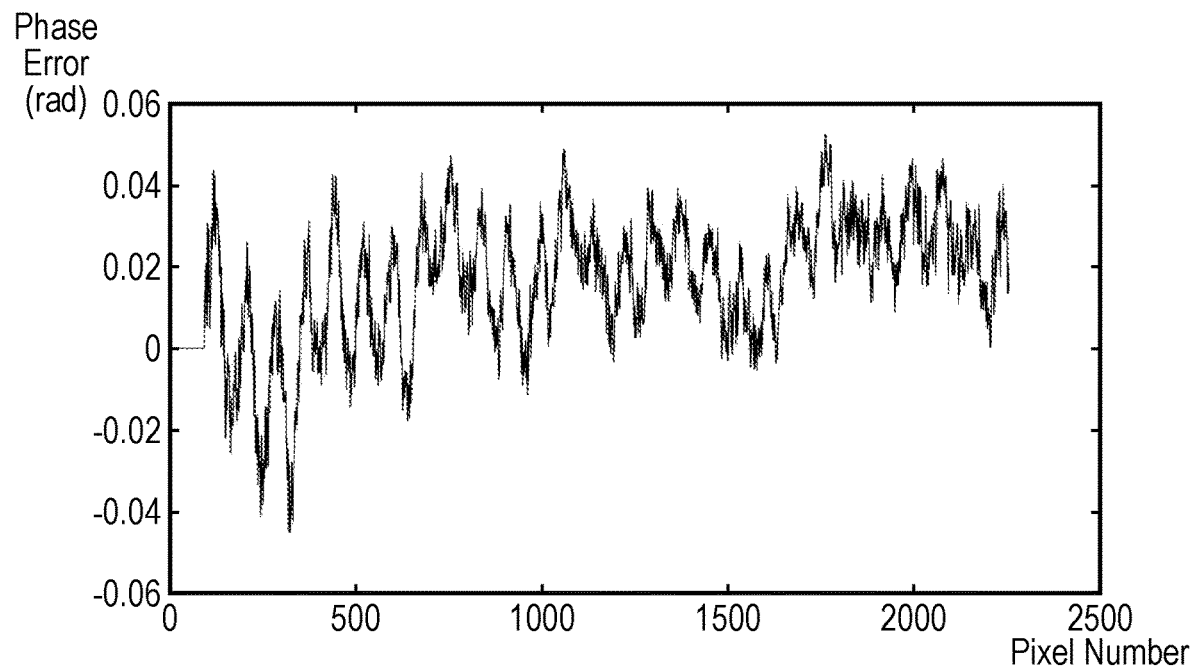
FIGS. 4a-4b show the comparison of the residual phase error using a grating (FIG. 4b) compared with that using a DLP projector (FIG. 4a), according to an example.
Figure 4B:
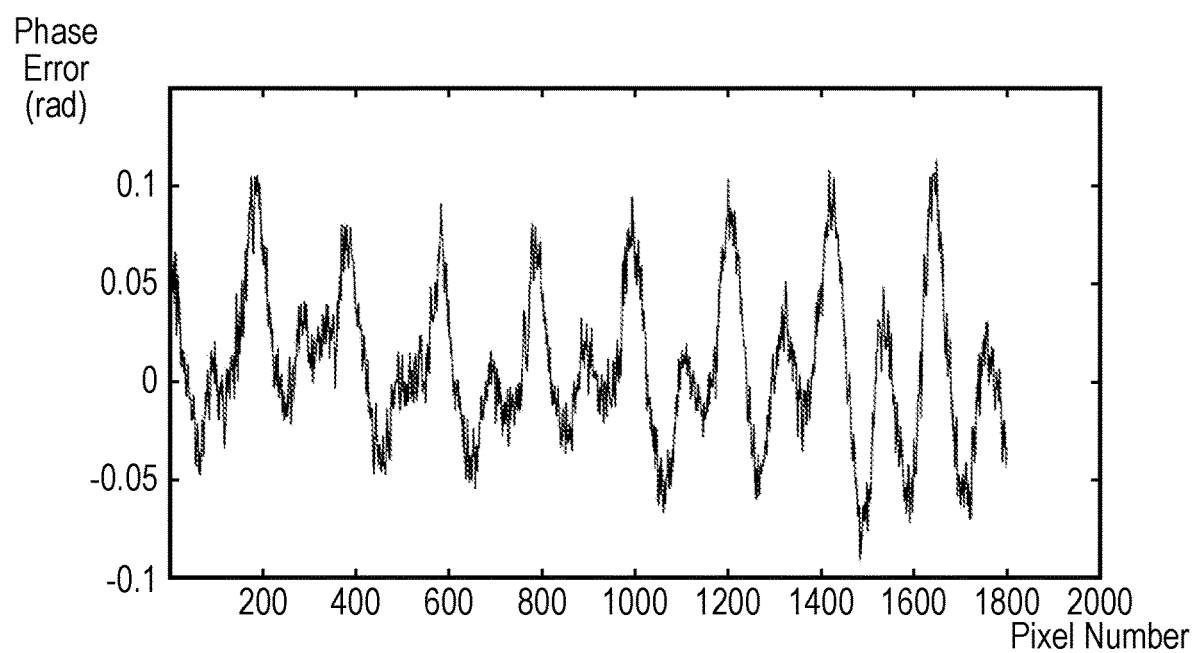

The phase error with moving the illumination source is compared with the projector as shown in FIGS. 4a-4b. That is, FIGS. 4a-4b show the comparison of the residual phase error using a grating (4b) compared with that using a DLP projector (4a), according to an example.

Thus, according to an example, moving the illumination source to generate phase shifted images can replace the traditional projector for 3D capture.

According to an example, another way of changing the position of the illumination source 103 is to use different illumination sources. For example, illumination source 103 can comprises multiple independently addressable sources. Each of these could be switched on/off in a row to generate phase shifted images. For example, four different illumination sources (LED's) can be placed in a row to obtain four 90° phase shifted images. The first illumination source can be switched on while the other three are switched off to obtain the first image. A second image which is 90° phase shifted from the first image can be obtained by switching on the second illumination source and switching off the rest of the illumination sources. Third and fourth image can be obtained in similar way.

When moving the illumination, the movement will be small relative to the object distance, as any movement of the illumination results in a minor change in the angle of illumination of light source which in turn has a surface orientation dependent effect on the reflectance seen by the camera. For example, the reflectance of a Lambertian surface depends directly on the cosine of the angle between the illumination source and the surface normal.

Figure 5:
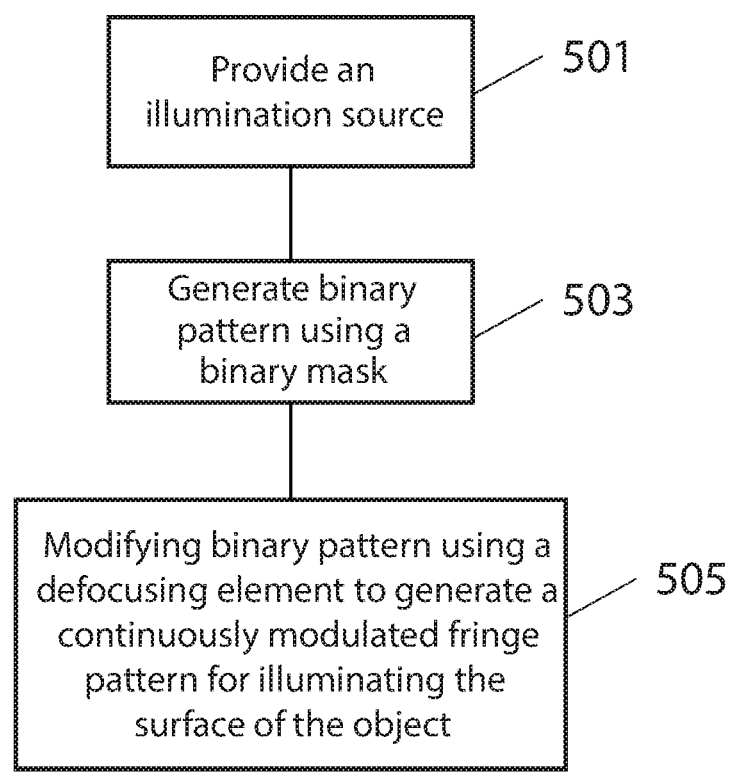
FIG. 5 is a flowchart of a method for determining a surface structure of an object according to an example.

FIG. 5 is a flowchart of a method for determining a surface structure of an object according to an example. In block 501 an illumination source is provided. As described above, a source comprising a single LED, for example, may be used, or multiple LEDs can be used. A local focussing/beam forming element may also be provided to collimate the output of the or each LED for example. Other illumination sources can be used, including non-visible such as infra-red for example. In block 503 a binary pattern is generated using a binary mask. The binary pattern is generated, in an example, as a result of the visible or non-visible radiation passing through the binary mask, which obscures some parts of the light from passing. A suitable masking material can be selected depending on the nature of the illumination source being used. For example, a masking that blocks infra-red may be appropriate of such an illumination source is being used.

In block 505, the binary pattern is modified using a defocusing element to generate a continuously modulated fringe pattern for illuminating the surface of the object. For example, as described above, a lens can be used so that a substantially sinusoidal wave pattern is provided.

Figure 6:
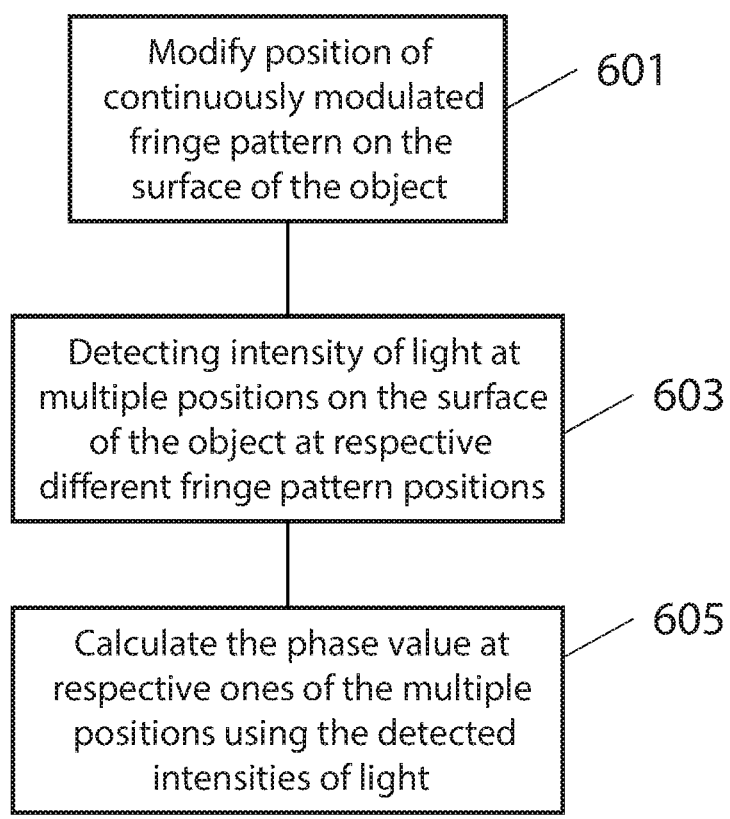
FIG. 6 is a flowchart of a method for determining a surface structure of an object according to an example.

FIG. 6 is a flowchart of a method for determining a surface structure of an object according to an example. In block 601 the position of the continuously modulated fringe pattern is modified on the surface of the object. As described above, the illumination source, the binary mask and the defocusing element can be disposed along an axis. As such, modifying the position of the continuously modulated fringe pattern on the surface of the object can be executed by shifting or translating one of: the illumination source, the binary mask and the defocusing element in a direction perpendicular to the axis, A. This can be done using the stage 117 for example.

In block 603, the intensity of light at multiple positions on the surface of the object at respective different fringe pattern positions is detected. In block 605, a phase value at respective ones of the multiple positions is calculated using the detected intensities of light. In block 607, the calculated phase values are used to generate a measure for the height of the object at respective ones of the multiple positions.

Figure 7:
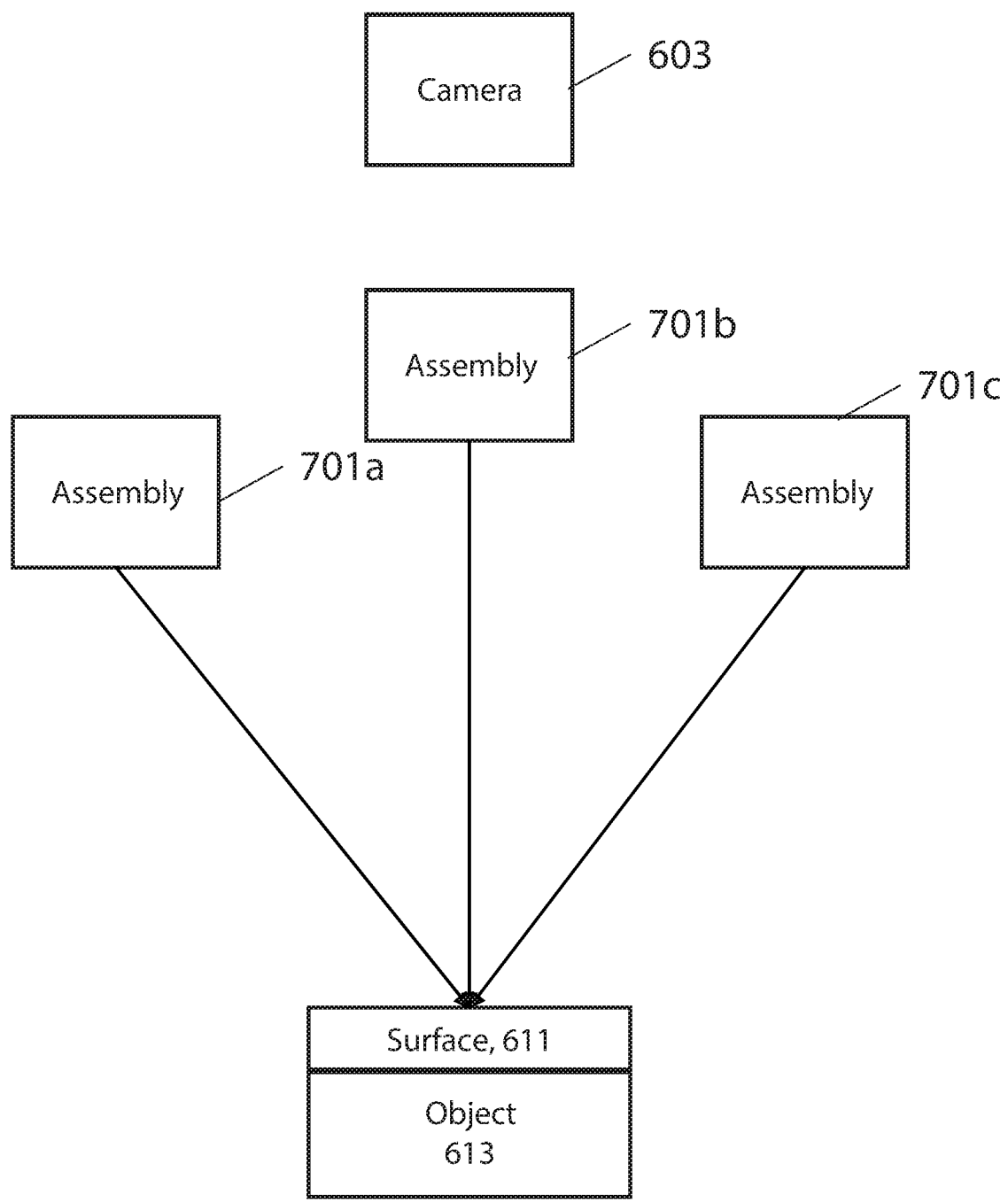
FIG. 7 is a schematic representation of a system according to an example.

FIG. 7 is a schematic representation of a system according to an example. As shown in FIG. 7, multiple assemblies 701a-c are shown, each of which is the same as assembly 101 of FIG. 1. Each assembly generates a fringe pattern as described above which is used to illuminate the surface 611 of an object 613. The resultant images from the surface 611 as a result of this can be captured using a camera 603. Each assembly can be triggered one after the other to illuminate the surface from a different angle, and the resultant images will therefore exhibit phase shifts that can be used to determine the surface structure of the object 613.

A system as described herein is therefore low cost and lightweight. It also reduces the size of a 3D scanner system as high-resolution projectors are bulky, which means that it is more portable, thereby enabling small robotic arms, for example, to carry it for automated scanning. Furthermore, power consumption is significantly reduced allowing the 3D scanner to be hand-held, battery operated and wireless.

The scan area can be increased without increasing the cost, as a larger grating and more powerful illumination source do not increase the cost considerably. In an example, a dual projector solution (one horizontal and one vertical) can be used to reduce asymmetry of the recovered 3D data at small incremental cost, and overcome occlusions.

A system as described herein in which multiple sources of illumination are used has no moving parts, and provides the potential for high resolution. Multiple devices can be combined to build a scan bar that would enable surface scanning of large areas at high resolution e.g. an MJF (Multi Jet Fusion) print bed.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A system for determining the surface structure of an object, the system comprising a first assembly including:
   an illumination source; and
   a binary mask to generate a binary pattern, the binary mask disposed between the illumination source and a defocusing element to modify the binary pattern to provide a continuously modulated fringe pattern to illuminate the surface of the object; and
a linear translation stage to shift one of: the illumination source, the binary mask, or the defocusing element in position relative to the other two to modify a position of the continuously modulated fringe pattern on the surface of the object, wherein the illumination source, the binary mask and the defocusing element are disposed along an axis, and wherein the linear translation stage is to translate one of: the illumination source, the binary mask, or the defocusing element in a direction perpendicular to the axis.

2. A system as claimed in claim 1, wherein the defocusing element is a low pass filtering device to suppress higher order harmonics of a square wave generated using the binary mask.

3. A system as claimed in claim 1, wherein the illumination source is a broadband light source.

4. A system as claimed in claim 1, further comprising:
   a second assembly disposed in spaced relation to the first assembly to generate a second continuously modulated fringe pattern.

5. A system as claimed in claim 1, wherein the illumination source comprises multiple independently addressable light sources.

6. A method for determining a surface structure of an object, the method comprising:
   generating a binary pattern using a binary mask to be illuminated using an illumination source;
   illuminating the surface of the object with a continuously modulated fringe pattern generated by modifying the binary pattern using a defocusing element, wherein the illumination source, the binary mask and the defocusing element are disposed along an axis
   translating one of: the illumination source, the binary mask and the defocusing element in a direction perpendicular to the axis to modify the position of the continuously modulated fringe pattern on the surface of the object.

7. A method as claimed in claim 6, further comprising:
   detecting the intensity of light at multiple positions on the surface of the object at respective different fringe pattern positions.

8. A method as claimed in claim 6, further comprising:
   using a calibration process, generating a set of mappings relating structure height to phase shift.

9. A method as claimed in claim 7, further comprising:
   calculating a phase shift value at respective ones of the multiple positions using the detected intensities of light.

10. A method as claimed in claim 9, further comprising:
    using the calculated phase shift values to generate a measure for the height of the object at respective ones of the multiple positions.

11. A method as claimed in claim 6, wherein light emitted by the illumination source passes through apertures in the binary mask to provide the binary pattern.

12. A system as claimed in claim 1, wherein light emitted by the illumination source passes through apertures in the binary mask to provide the binary pattern.

13. A method as claimed in claim 6, wherein the binary mask is a square wave grating.

14. A system as claimed in claim 1, wherein the binary mask is a square wave grating.

* * * * *